Feb. 6, 1945. F. H. MUELLER ET AL 2,368,768
LUBRICATED VALVE
Original Filed Sept. 18, 1940 2 Sheets-Sheet 1
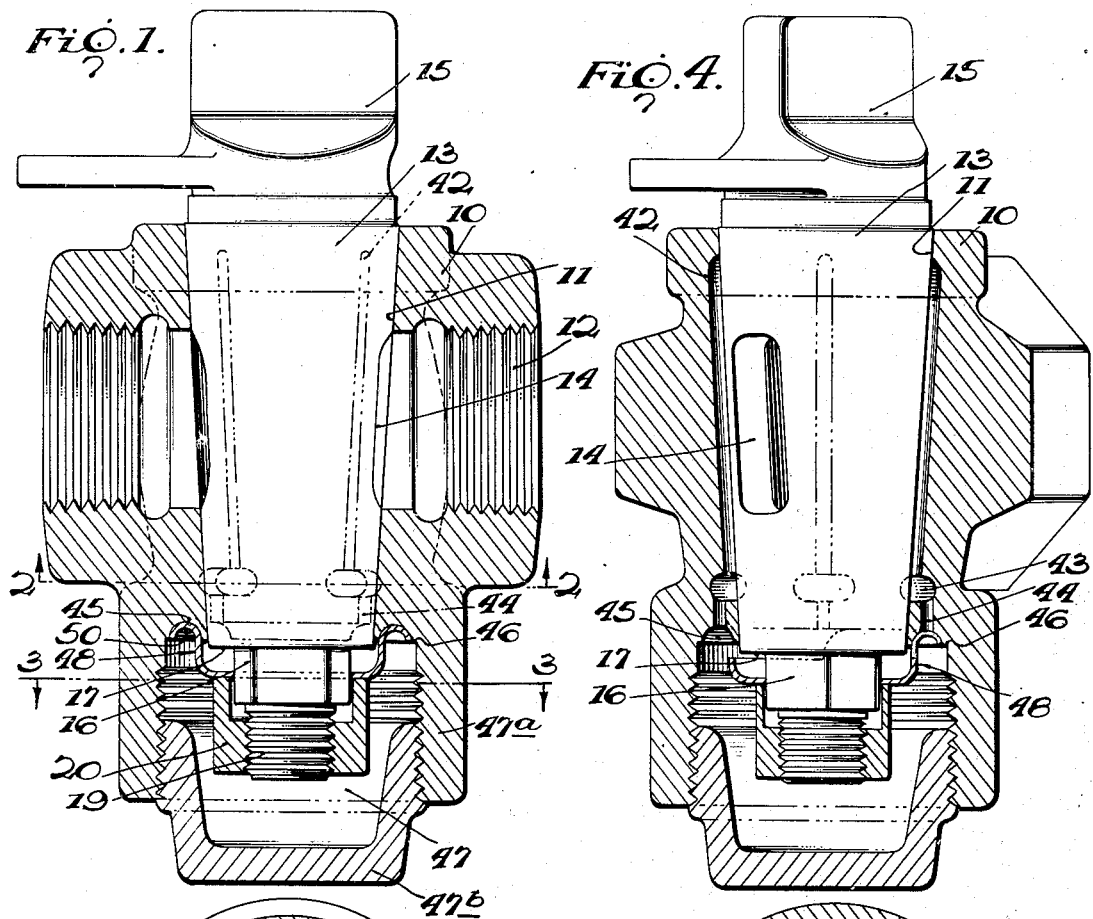
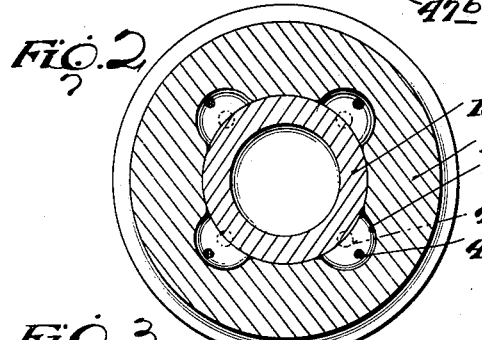
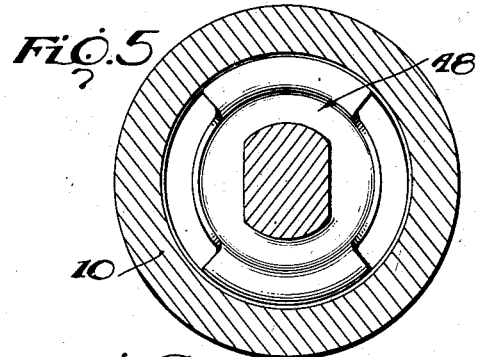
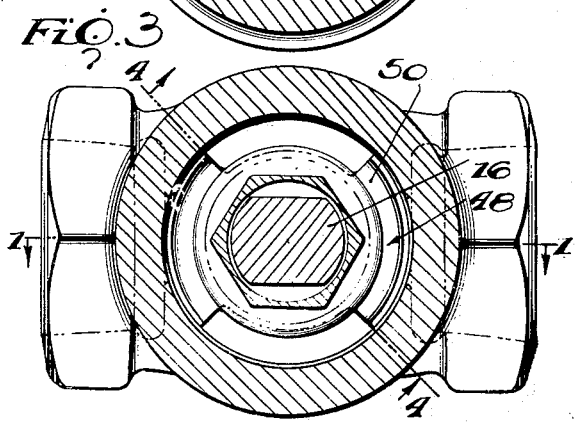
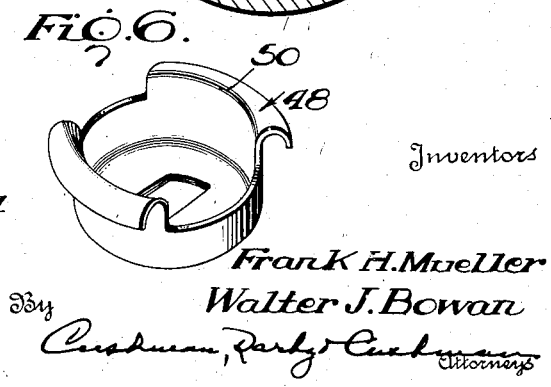
Inventors
Frank H. Mueller
Walter J. Bowan
By Cushman, Darby & Cushman
Attorneys Feb. 6, 1945.     F. H. MUELLER ET AL     2,368,768
LUBRICATED VALVE
Original Filed Sept. 18, 1940    2 Sheets-Sheet 2
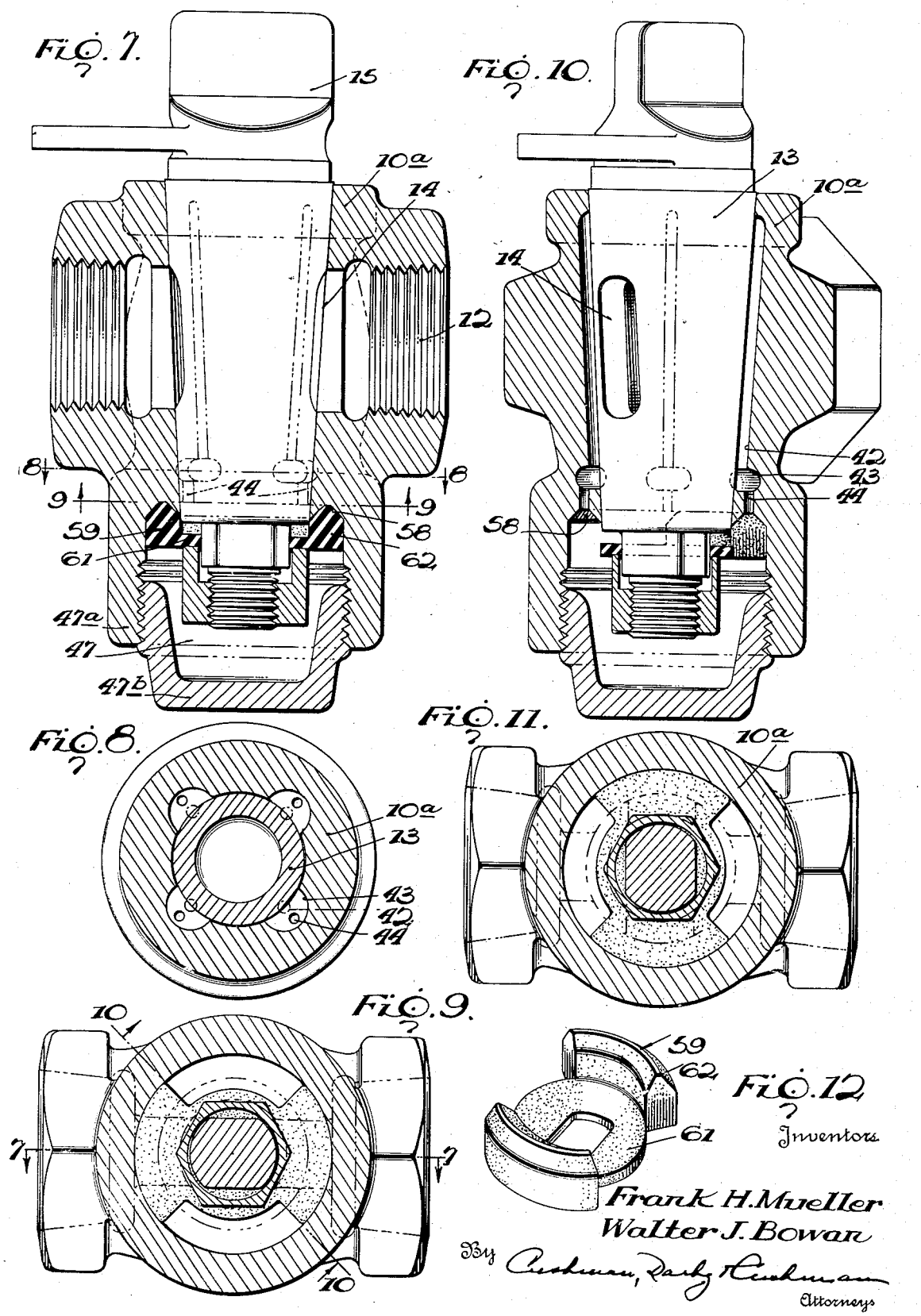

Patented Feb. 6, 1945

2,368,768

UNITED STATES PATENT OFFICE 2,368,768

LUBRICATED VALVE

Frank H. Mueller and Walter J. Bowan, Decatur, Ill., assignors to Mueller Co., Decatur, Ill., a corporation of Illinois Original application September 18, 1940, Serial No. 357,328. Divided and this application November 9, 1942, Serial No. 465,036

4 Claims. (Cl. 251—93)

The present invention relates to lubricated valves.

This application is a division of our application for Lubricated valves, Serial No. 357,328, filed September 18, 1940.

The principal objects of the invention are to provide a valve which will maintain lubricant under proper pressure and avoid all possibility of the lubricant escaping to the line during the movement of the valve plug, all with maximum simplicity.

Other objects and advantages of the invention will be apparent from the following specification and drawings wherein:

Figure 1 is an axial section through a valve taken on the line 1—1 of Figure 3;

Figure 2 is a transverse section on the line 2—2 of Figure 1;

Figure 3 is a transverse section on the line 3—3 of Figure 1;

Figure 4 is an axial section on the line 4—4 of Figure 3;

Figure 5 is a view similar to Figure 3 but showing the control member turned 90° from the Figure 4 position;

Figure 6 is a perspective view of the control member illustrated in Figures 1 to 5;

Figure 7 is an axial section of a modified form of valve, the view being taken on the line 7—7 of Figure 9;

Figure 8 is a transverse sectional view on the line 8—8 of Figure 7;

Figure 9 is a transverse sectional view on the line 9—9 of Figure 7;

Figure 10 is an axial sectional view on the line 10—10 of Figure 9;

Figure 11 is a view similar to Figure 9 but showing the control member turned through 90°, and Figure 12 is a perspective view of the control member used with the structure of Figures 7 to 11.

Referring to Figures 1 to 6, the numeral 10 designates a body or casing element provided with a tapered seat 11 and a transverse flow passageway 12. The tapered seat 11 has a plug or valve element 13 mounted therein provided with a flow port 14. The larger end of the plug projects from the casing element 10 and includes an operating stud 15. The reduced end of plug 13 is equipped with a shank 16 projecting from its end surface 17, shank 16 being flattened on one side so that a control member 48 carried on the shank will rotate with the plug. The extreme end of shank 16 is threaded as indicated at 19 to carry a nut element 20, all within a lubricant chamber 47 formed by an extension 47a of the casing member 10 and a closure member 47b threadedly mounted in the extension 47a.

The seating surface of the casing element 10 is provided with longitudinally extending lubricant grooves 42 of less length than the seating surface. Four grooves 42 are preferably provided, these grooves being equi-distantly spaced about or with respect to the seating surface so that two grooves are positioned between each adjacent edge of the opposed mouths of flow passageway 12. The ends of the grooves 42 adjacent the lubricant chamber 47 open to pockets 43 and each pocket has a port 44 extending therefrom to an annular groove 45 which extends about the shoulder 46 that defines the innermost portion of the lubricant chamber 47. As best shown in Figure 3, the groove 45 is of rounded or U-shaped form in radial section.

The lubricant control member or washer 48 is formed of heavy sheet metal having some resiliency and is of cup-shaped form, as shown in Figure 6, with two diametrically opposite extensions 50 which are curled to conform to the radial section of the groove 45.

The structure shown in Figures 7 to 12 is identical with that disclosed above except that the casing member 10a of the device shown in Figures 7 to 12 is provided with an annular groove 58 which is of V-shaped form in radial section, instead of being rounded as is the case with the groove 45 of Figures 1 to 6. In addition, the control member 59 of Figures 7 to 12 includes a flat plate portion 61 and diametrically opposed ribs 62, each of substantially 90° in circumferential length, which have their edges of V-shaped form to contact with the surfaces of the V-shaped groove 58. The control member or washer 61 is illustrated as being formed of heavy rubber but it will be obvious that it may be formed entirely of metal, or may include a metal plate carrying strips of rubber.

The curled extensions 50 and the ribs 62 of the respective forms of the invention discussed above will be positioned on a valve plug directly in alignment with the flow ports 14 of the plug. That is, the curled extensions and ribs will be axially in alignment with the flow port of the plug. Hence, when a plug is rotated in a counter-clockwise direction from the open positions indicated in Figures 1 and 7, the curled extension 50 and the rib 62 will move along the opposed surfaces 45 and 58, respectively, to close the ports 44 corresponding to the grooves 42 which will be opened to the flow passageway 12 during such rotation of plug 13. As a result, these two grooves 42 will not be subject to the pressure existing within the chamber 47 during movement of the plug and the grease cannot be expelled therefrom.

When the plug reaches closed position as a result of such movement, the trailing end of a curled extension 50 or rib 62 will move out of contact with the port 44 which has been covered during the movement of the plug so that all four ports 44 and grooves 42 will again be subject to the pressure existing within chamber 47.

It will be apparent that during closing movement of a valve plug, the two grooves 42 which will be opened to the flow passageway 12 will again be isolated from the pressure within chamber 47.

It will be observed that both structures described above involve the provision of grease ports 44 which are radially spaced from the seating surface 11 of the valve body element and this permits the use of a control element which completely covers the ports 44 and extends for a substantial distance in a radial direction on each side of such ports as best indicated in Figures 4 and 10.

Grease may move from the chamber 47 of the Figure 1 structure to the uncovered grease ports 44 between the curled extensions 50 of the control member 48. The same movement of grease may occur with the control member 61, the grease flowing between the ends of the ribs 62. However, because the curled extensions 50 of Figure 1 and the ribs 62 of Figure 7 are of substantial dimension or area in a radial plane, being considerably wider than the diameter of the ports 44, there will be no possibility of grease reaching a closed port 44 by movement of grease in a direction radially of the extensions 50 or ribs 62. The fact that the control members are of resilient material will, of course, insure a proper seating of the curled extensions and ribs against the opposed surfaces 45 and 58, respectively.

It has heretofore been proposed to have longitudinal lubricant grooves extend to a point where they will directly communicate with the lubricant chamber of a valve and to have such grooves controlled by a washer moving with the plug. However, a lubricant groove arranged in that manner cannot be adequately sealed because grease can always readily move between the shank of the valve and the inner end of the annular washer to reach the grooves. Therefore, such grooves are never entirely isolated from the lubricant chamber. The present invention, involving having the longitudinal grooves communicate with ports spaced radially from the seating surface and opening to the apex of a groove so that they may be contacted by a washer of substantial radial width, obviously prevents such leakage by a structure of extreme simplicity.

It will be understood that in both forms of the invention, the ports closed during plug rotation will be those which communicate with grooves 42 that are opened to the flow passageway during plug movement.

It will be observed that both of the control members disclosed herein serve to urge the plug toward the reduced end of the casing member seating surface, as well as to control the flow of lubricant. It will be clear that the pressure of the lubricant can be increased by threading the closure 47b further into the extension 47a of the casing member.

The terminology used in the specification is for the purpose of description and not of limitation, the scope of the invention being set forth in the accompanying claims.

We claim:

1. A valve comprising a casing member having a passageway for flow of fluid and a seat formed transversely of the passageway, a plug member rotatably disposed in the seat and having a fluid passageway therethrough, the casing member having grooves therein extending longitudinally of the seating surface, a lubricant chamber at one end of the casing member seat, said longitudinally extending grooves terminating at a point on the seating surface spaced from said chamber, said lubricant chamber including an annular shoulder extending at an angle to the axis of the seat and adjacent the casing member seating surface, said shoulder having an annular groove therein, separate ports formed entirely within the casing member extending from the annular groove to each of the longitudinally extending grooves so that a longitudinal groove and its associated port will form a grease passage, and a control member rotatable with the plug member including a bearing surface of such contour in radial section as to conform to the contour of the annular groove, the bearing surface of said control member bearing solely within said groove, the entire mouth of each port opening to said annular groove being laterally spaced from the seating surface to be independent of the latter and to make said grease passages independent of each other so that during rotation of the control member with the plug the grease passages which are open to the fluid passageway will be isolated from the other grease passages and the grease chamber.

2. A valve as defined in claim 1 wherein the control member is resilient.

3. A valve as defined in claim 1 wherein the annular groove and the bearing surface of said control member are rounded in radial section.

4. A valve as defined in claim 1 wherein the annular groove and the bearing surface of said control member are V-shaped in radial section.

FRANK H. MUELLER.
WALTER J. BOWAN.